Figure 1:
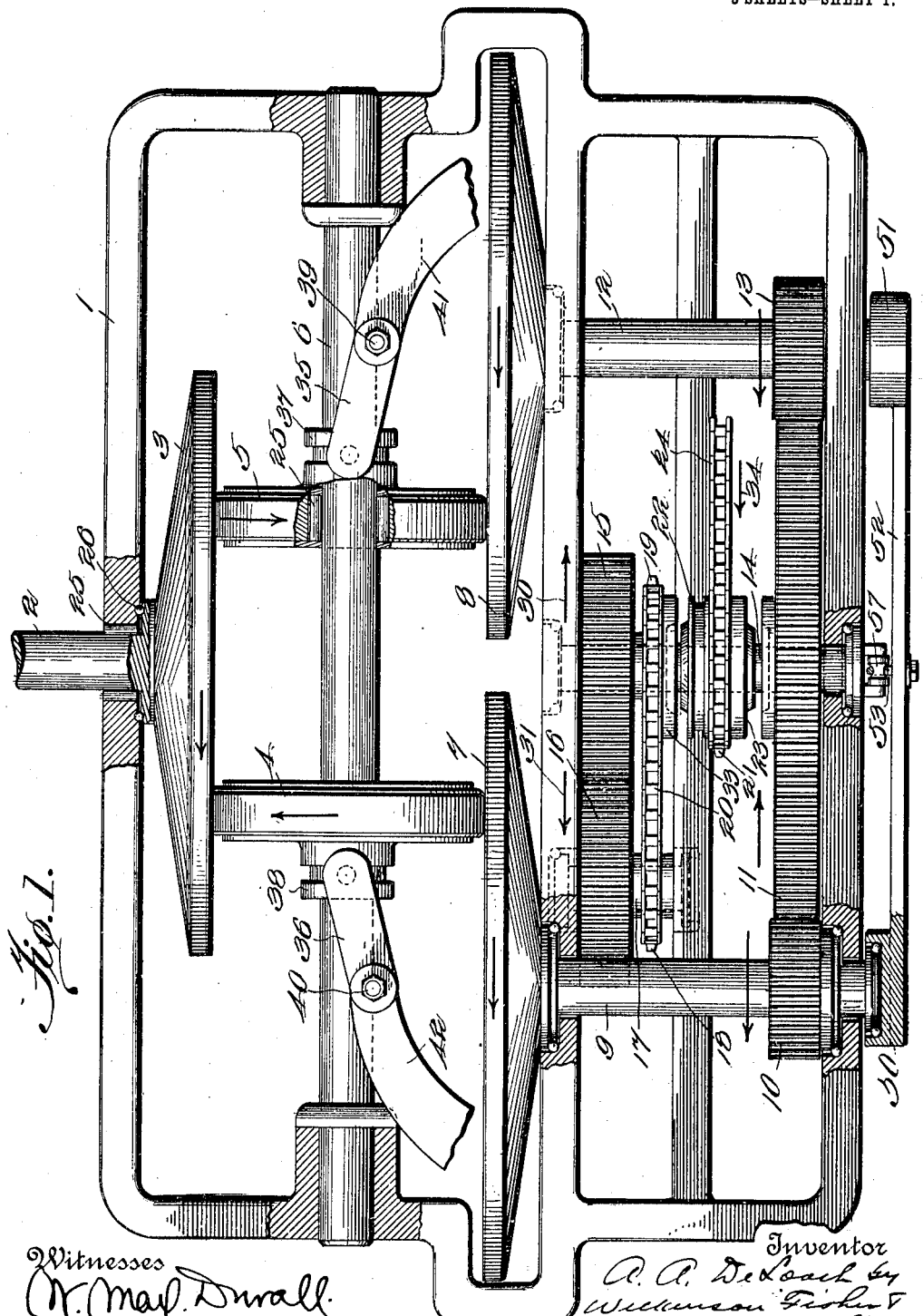

A. A. DE LOACH.
FRICTION TRANSMISSION GEARING.
APPLICATION FILED OCT. 4, 1909.

970,190.

Patented Sept. 13, 1910.

3 SHEETS—SHEET 1.

Witnesses

Inventor

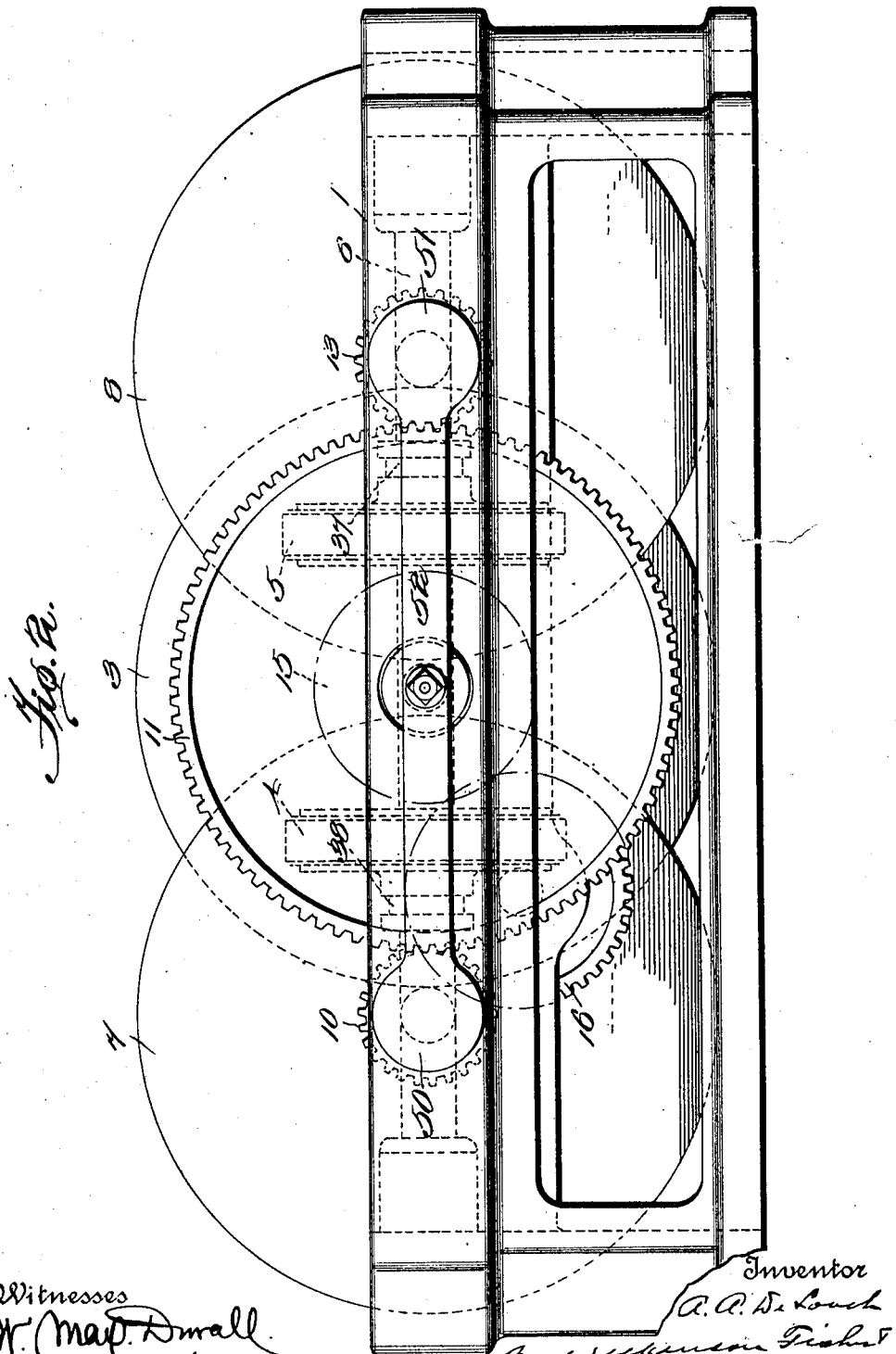

A. A. DE LOACH.
FRICTION TRANSMISSION GEARING.
APPLICATION FILED OCT. 4, 1909.
970,190.
Patented Sept. 13, 1910.
3 SHEETS—SHEET 3.
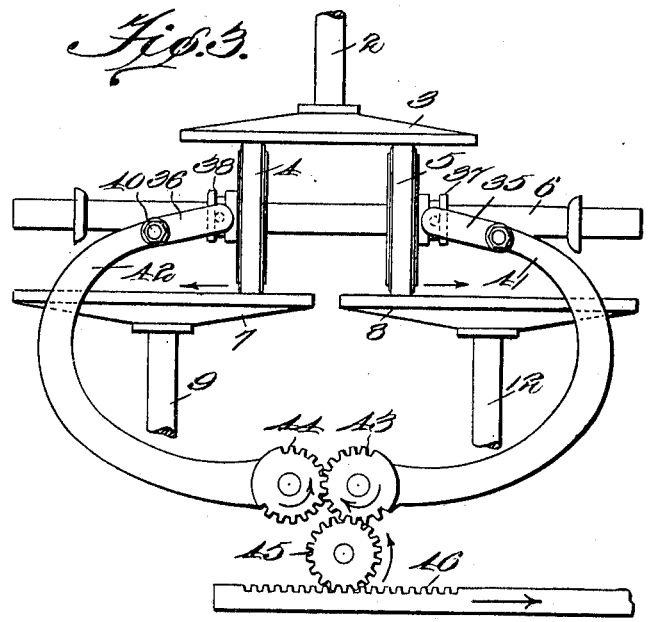
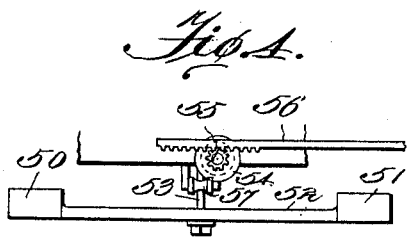
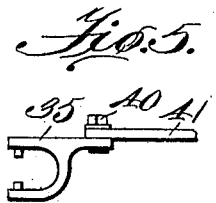
Witnesses
W. May. Duvall.
B. B. Collings.
Inventor
A. A. De Loach
Wilkinson Fisher &
Wilkinson
Attorney

UNITED STATES PATENT OFFICE.

ALONZO A. DE LOACH, OF BRIDGEPORT, ALABAMA.

FRICTION TRANSMISSION-GEARING.

970,190.  Specification of Letters Patent.  Patented Sept. 13, 1910.

Application filed October 4, 1909. Serial No. 521,010.

*To all whom it may concern:*

Be it known that I, ALONZO A. DE LOACH, a citizen of the United States, residing at Bridgeport, in the county of Jackson and State of Alabama, have invented certain new and useful Improvements in Friction Transmission-Gearing; and I do hereby declare the following to be a full, clear, and exact description of the invention, such as will enable others skilled in the art to which it appertains to make and use the same.

My invention relates to variable friction transmission gearing, and has for its object to produce a device of this nature which will not only possess an initially broad range of variation in speed but will transmit more power for the space occupied than those of a like nature which have been heretofore invented.

With these and other objects in view the invention consists in the novel details of construction and combinations of parts more fully hereinafter disclosed and particularly pointed out in the claims.

Referring to the accompanying drawings forming a part of this specification in which like parts are designated by like numerals in all the views:—

Figure 1, is a plan view, partly in section, of a mechanism made in accordance with my invention; Fig. 2, is an end elevational view of the parts shown in Fig. 1; Fig. 3, is a diagrammatic view showing means for changing the speed; and Figs. 4 and 5 are diagrammatic views of details of the mechanism.

1 represents a suitable framework preferably a casting, in which the parts are mounted, 2 a shaft receiving power from any suitable source, 3 a driving disk rigid with said shaft, 4 and 5 frictional driven power transmitting disks mounted upon the shaft 6 journaled in the framework 1, and 7 and 8 are power transmitting disks frictionally engaging the disks 4 and 5, as illustrated. The disk 7 is provided with a shaft 9 carrying the pinion 10, meshing with the gear 11, and the disk 8 is mounted on the shaft 12 carrying the pinion 13 also meshing with the gear 11. The said gear 11 is mounted on the shaft 14 carrying the pinion 15 engaging the pinion 16, mounted on the shaft 17. The shaft 17 carries the sprocket 18, the shaft 14 carries the sprocket 19 which is loosely mounted thereon, and the chain 20 connects the two sprockets 18 and 19, as shown. The shaft 14 carries the sprocket 21 rigid with the clutch members 22 and 23 adapted to engage the hub of the sprocket 19 and the hub of the wheel 11, respectively. The sprocket 21 carries the chain 24 adapted to engage a like sprocket not shown, on the shaft to which the power is to be transmitted.

25 represents roller bearings and 26 ball bearings with which the various shafts may be provided, as shown.

The operation of the invention, so far as now described, is as follows:—Supposing power to be transmitted to the shaft 2 in such a manner as to turn the driving disk 3 in the direction of the arrow; the transmitting disks 4 and 5 will be driven in the direction of the arrows shown thereon, and the friction disks 7 and 8 will be driven in the same direction, as indicated by the arrows shown thereon; which in turn will cause their respective pinions 10 and 13 to be driven in the same direction and to simultaneously turn the gear 11, in the direction of the arrow shown in connection therewith. The gear 11 will turn the pinion 15 in the direction of the arrow 30 and the said gear 15 will turn the gear 16 in the direction of the arrow 31. The gear 16 will turn the sprocket 18 in the direction of the arrow 31 and if the clutch member 22 is not in engagement with the sprocket 19 the last mentioned sprocket will turn idly on the shaft 14. If, however, the clutch member 22 is in engagement with the hub 33 of the sprocket 19, then said sprocket will cause the clutch member 22 and the sprocket 21 to be turned in the direction of the arrow 34, thereupon transmitting power through the chain 24 in the same direction to the shaft to which it is desired to deliver power. On the other hand, if the clutch member 23 is in engagement with the hub of the gear 11, the power will be transmitted from said gear 11 to the chain 24 in the direction opposite to that of the arrow 34, and the shaft to which the power is being delivered by the said chain 24 will be reversed. That is to say, by merely moving the clutch members 22 and 23 along the shaft 14 by any suitable and well known means, not shown, the sprocket chain 24 may be reversed.

In order to change the speed of the various disks, and consequently that of the sprocket chain 24, I provide the links 35 and 36 connected respectively with the hubs 37 and 38 of the disks 5 and 4, and to these links are pivoted as at 39 and 40 the levers 41 and 42 provided respectively with the intermeshing pinions 43 and 44 driven by the pinion 45 which in turn may be driven by the rack bar 46, all as illustrated in Fig. 3.

It will be obvious that upon moving the rack bar 46 in the direction of the arrow, the pinion 45 will be turned counter clockwise, which will thereupon move the pinions 43 and 44 in the directions of the arrows on said pinions, and said last named pinions will, through the levers 41 and 42, cause the said transmission disks 5 and 4 to be moved radially outward along the surfaces of the disk 3, as indicated by the arrows. The movement of the disks 4 and 5 outwardly toward the circumference of the disk 3, of course, will cause said disks 4 and 5 to be speeded up, and the movement of said disks toward the centers of the friction disks 7 and 8 will, again, cause the shafts 9 and 12 to be still further speeded up. On the other hand, if the disks 4 and 5 are moved in toward the center of the disk 3, the speed will not only be decreased by reason of the shorter radius pertaining to the points of contact on the disk 3, but the speed of the shafts 9 and 12 will be still further decreased, owing to the greater radius of the points of contact upon the disks 7 and 8. It is, therefore, evident that a very slight change in the positions of the disks 4 and 5 will cause a very large variation in the speed of the sprocket chain 24, while, at the same time, by merely shifting the clutch members 22 and 23, this variable speed may be readily reversed.

The friction transmitting disks 4 and 5 are provided with compressed paper or other resilient surfaces, and the necessary tension is brought on said surfaces by means of thrust bearings 50 and 51 carried by the bar 52 and acting, respectively, on the ends of the shafts 9 and 12. This bar is provided with a cable 53 passing over a drum 54 the axle of which carries a pinion 55 meshing with the rack bar 56. A roller 57 may be provided to suitably guide the cable 53. It is evident that a movement imparted to the rack bar 56 will tighten up the cable 53 and cause the thrust bearings 50 and 51 to increase the friction of the disks 7 and 8 on the contacting surfaces of the transmission disks 4 and 5.

It is well known that a friction drive in order to be successful must be capable of great speed and with a very light pressure between the friction surfaces. Therefore, if great power is to be transmitted, it is very advantageous indeed to duplicate the friction transmitting disks as has been done in the disks 4 and 5, for that this enables double power to be transmitted in practically the same space.

The mechanism disclosed is essentially adapted for driving automobiles and for similar purposes, for that with a very small mechanism not only is double the power transmitted, but a very much greater variation of speed is obtained than would be the case with a single disk. Besides, this greater output of power can be readily reversed even while the speed is being changed.

The device is also applicable to varying speeds of wood working or metal working machines running at a high velocity or in fact it may be used with almost any kind of machinery whether reversible or nonreversible.

When starting the machine, if the disks 4 and 5 are placed near the center of the disk 3, the resistance of the transmitted power through the shaft 2 is very light, and since the said disks 4 and 5 when thus located will work on the largest diameters of the driven disks 7 and 8, the greatest multiplication of power will be obtainable from said disks upon starting the machine and just at the time when it is most needed. After the machine is once started, it is evident that by simply shifting the disks 4 and 5, the machine may be gradually speeded up and without any undue straining of the parts, thereby permitting the power to be used at the best advantage, while permitting the motor to run at full speed at all times.

It is obvious that those skilled in the art may vary the arrangement of parts and details of construction without departing from the spirit of my invention, and, therefore, I do not wish to be limited to such features except as may be required by the claims.

What I claim is:

1. In a friction driving gearing the combination of a driving shaft; a friction disk rigid therewith; a plurality of friction power transmitting disks in frictional engagement with said first mentioned disk; a plurality of frictionally driven disks in engagement with said transmitting disks; shafts rigid with said driven disks; pinions on said shafts; a single gear 11 driven in the same direction by said pinions; a means 24 for transmitting power from said gear 11; and connections between said means and said gear; substantially as described.

2. In a friction driving gearing, the combination of a shaft; a friction disk rigid therewith; a plurality of friction power transmitting disks in frictional engagement with said first mentioned disk; a plurality of frictionally driven disks in engagement with said transmitting disks; shafts rigid with said driven disks; pinions on said shafts; a single gear 11 driven in the same direction by said pinions; a shaft 14 on which said gear is mounted; a means 24 for transmitting power from said gear 11; and connections comprising a pinion 15 and a loose wheel 19 on said shaft 14 between said means and said gear; substantially as described.

3. In a friction driving gearing the combination of a driving shaft; a friction disk rigid therewith; a plurality of friction power transmitting disks in frictional engagement with said first mentioned disk; a plurality of frictionally driven disks in engagement with said transmitting disks; shafts rigid with said disks; pinions on said shafts; a single gear 11 driven in the same direction by said pinions; a shaft 14 on which said gear is mounted; a means 24 for transmitting power from said gear 11; connections between said means and said gear, comprising a pinion 15 and a loose sprocket wheel 19 on said shaft 14; a shaft 17; a pinion 16 on said shaft 17 engaging said pinion 15; a sprocket wheel 18 on said shaft 17; and a sprocket chain connecting said sprockets 18 and 19; substantially as described.

4. In a friction driving gearing, the combination of a driving shaft; a friction disk rigid therewith; a plurality of friction power transmitting disks in frictional engagement with said first mentioned disk; a plurality of frictionally driven disks in engagement with said transmitting disks; shafts rigid with said driven disks; pinions on said shafts; a single gear 11 driven in the same direction by said pinions; a shaft 14 on which said gear is mounted; a means 24 for transmitting power from said gear 11; connections between said means and said gear, comprising a pinion 15 and a loose sprocket wheel 19 on said shaft 14, a shaft 17; a pinion 16 on said shaft 17, engaging said pinion 15; a sprocket wheel 18 on said shaft 17; a sprocket chain connecting said sprockets 18 and 19; and a clutch mechanism adapted to reverse the motion of said means 24, without reversing the motion of said driving shaft; substantially as described.

5. In a friction driving gearing the combination of a driving shaft; a friction disk rigid therewith; a plurality of power transmitting disks engaging the same side of said friction disk; a plurality of frictionally driven disks engaging said power transmitting disks; different shafts on which said driven disks are mounted and means to slide said power transmitting disks radially of the first mentioned disk, and also radially of the said driven disks, substantially as described.

6. In a friction driving gearing the combination of a driving shaft; a friction disk rigid therewith; a plurality of power transmitting disks engaging said friction disk; a shaft on which said power transmitting disks are slidably mounted; a plurality of frictionally driven disks engaging said power transmitting disks; and means to slide said power transmitting disks radially toward the center of the first mentioned disk, and also radially away from the centers of the said driven disks; means to compel said sliding means to move said power transmitting disks simultaneously; shafts rigid with said frictionally driven disks; pinions on said shafts; and means to transmit the power from said pinions to a distant point; substantially as described.

7. In a friction driving gearing, the combination of a driving shaft; a friction disk rigid therewith; a plurality of power transmitting disks engaging said friction disk; a plurality of frictionally driven disks engaging said power transmitting disks; means to slide said power transmitting disks radially of the first mentioned disk and also radially of the said driven disks; shafts rigid with said frictionally driven disks; pinions on the shafts; a single gear meshing with said pinions; a sprocket chain 24 adapted to transmit power to a distant point; a clutch connection and a sprocket 21 between said sprocket chain and said single gear; substantially as described.

8. In a friction driving gearing the combination of a driving shaft; a friction disk rigid therewith; a plurality of power transmitting disks engaging said friction disk; a plurality of frictionally driven disks engaging said power transmitting disks; means to slide said power transmitting disks radially of the first mentioned disk and also radially of the said driven disks; shafts rigid with said frictionally driven disks; pinions on the shafts; a single gear meshing with said pinions; a sprocket chain 24 adapted to transmit power to a distant point; a clutch connection and a sprocket 21 between said sprocket chain and said single gear; a sprocket 19; a shaft on which said single gear said clutch connection and said sprocket 19 are mounted; a pinion 15 on said last mentioned shaft; a pinion 16 meshing with said pinion 15; a shaft 17; a sprocket 18 mounted on said shaft 17; a chain 20 connecting said sprockets 18 and 19, and a clutch connection between said sprocket wheels 19 and 21, substantially as described.

9. In a friction driving gearing the combination of a driving shaft; a disk 3 rigid therewith; a plurality of disks 4 and 5 engaging said disk 3; a plurality of disks 7 and 9 engaging said disks 4 and 5; shafts 9 and 12 rigid with said disks 7 and 8; and thrust bearings engaging said shafts adapted to increase the friction between said disks 4 and 5, and said disk 3 on the one side and said disks 7 and 8 on the other side; substantially as described.

10. In a friction driving gearing, the combination of a driving shaft; a disk 3 rigid therewith; a plurality of disks 4 and 5 engaging said disk 3; a plurality of disks 7 and 8 engaging said disks 4 and 5; means for simultaneously moving said disks 4 and 5 radially of said disk 3 and radially of said disks 7 and 8 to change the speed of said disks 7 and 8; shafts 9 and 12 rigid with said disks 7 and 8; and thrust bearings engaging said shafts, adapted to increase the friction between said disks 4 and 5, and said disk 3 on the one side and said disks 7 and 8 on the other side; substantially as described.

11. In a friction driving gearing, the combination of a driving shaft; a disk 3 rigid therewith; a plurality of disks 4 and 5 engaging said disk 3; a plurality of disks 7 and 8 engaging said disks 4 and 5; means for simultaneously moving said disks 4 and 5 radially of said disk 3 and radially of said disks 7 and 8 to change the speed of said disks 7 and 8; shafts 9 and 12 rigid with said disks 7 and 8; thrust bearings engaging said shafts, adapted to increase the friction between said disks 4 and 5 and said disk 3 on the one side and said disks 7 and 8 on the other; pinions carried by said shafts; a single gear with which said pinions mesh; a shaft 14 for said gear; a sprocket 21 on said shaft and means 24 carried by said sprocket 21 for transmitting power to a distant point; substantially as described.

12. In a friction driving gearing the combination of a driving shaft; a disk 3 rigid therewith; a plurality of disks 4 and 5 engaging said disk 3; a plurality of disks 7 and 8 engaging said disks 4 and 5; means for simultaneously moving said disks 4 and 5 radially of said disk 3 and radially of said disks 7 and 8 to change the speed of said disks 7 and 8; shafts 9 and 12 rigid with said disks 7 and 8; and thrust bearings engaging said shafts, adapted to increase the friction between said disks 4 and 5, and said disk 3 on the one side and said disks 7 and 8 on the other; pinions carried by said shafts; a single gear with which said pinions mesh; a shaft 14 for said gear; a pinion 15 and a loose wheel 19 on said shaft 14; a pinion 16 engaging said pinion 15; a shaft 17; a sprocket wheel 18 and a pinion 16 on said shaft; a connection between said wheels 18 and 19; a clutch connection adapted to engage said wheel 19; and means carried by said shaft 14 for transmitting power to a distant point; substantially as described.

13. In a friction gearing, the combination of a driving shaft; a disk 3 rigid therewith; a plurality of friction disks 7 and 8 parallel to said disk 3; a plurality of disks 4 and 5 engaging said disk 3 and also engaging said disks 7 and 8; means for simultaneously sliding said disks 4 and 5 radially in one direction with respect to the center of said disk 3, and radially in an opposite direction with respect to the centers of said disks 7 and 8; means for simultaneously increasing the friction at will between said disks 7 and 8 and said disks 4 and 5; means for transmitting power from said disks 7 and 8 to a distant point; and means for reversing said power without changing the speed of the driving shaft; substantially as described.

In testimony whereof, I affix my signature, in presence of two witnesses.

ALONZO A. DE LOACH.

Witnesses:
JNO. W. RUSSELL,
EDW. M. GIBBENS.